United States Patent Office 3,483,173
Patented Dec. 9, 1969

3,483,173
VULCANIZABLE OLEFINIC COPOLYMERS AND PROCESS FOR THEIR PREPARATION
Giulio Natta, Giorgio Mazzanti, Gianfranco Pregaglia, Alberto Valvassori, and Guido Sartori, Milan, Italy, assignors to Montecatini Edison S.p.A., Milan, Italy
No Drawing. Continuation of application Ser. No. 316,544, Oct. 16, 1963. This application Mar. 28, 1968, Ser. No. 717,047
Claims priority, application Italy, Oct. 17, 1962, 20,410/62
Int. Cl. C08f 17/00
U.S. Cl. 260—80.78                                    10 Claims

ABSTRACT OF THE DISCLOSURE

There are disclosed herein amorphous, unsaturated copolymers of at least one monomer selected from ethylene and aliphatic alpha-olefins, and hydrocarbons containing at least one cycloheptatrienic ring and having, therefor, conjugated double bonds in the molecule. The hydrocarbon containing at least one cycloheptatrienic ring is either monocyclic or, if polycyclic, has either isolated nuclei or fused type rings. It contains no bridged ring. The copolymers are vulcanizable to elastomers having good properties. There is also disclosed a process for obtaining these copolymers by copolymerizing a mixture of the monomers in contact with catalysts prepared from vanadium compounds and organometallic compounds or hydrides, or complex organometallic compounds or hydrides, of metals belonging to Groups I to III of the Mendelyeev Periodic Table.

---

This application is a continuation of application Ser. No. 316,544 filed Oct. 16, 1963, now abandoned.

In Italian Patents 565,530 and 638,953 and in Belgian Patents 623,698 and 623,741 the preparation of amorphous, vulcanizable copolymers through copolymerization of ethylene and/or aliphatic alpha-olefins with conjugated or non-conjugated linear or cyclic dienes or polyenes, has already been described.

We have now found, according to the present invention, that by means of particular catalysts acting through an anionic, coordinated type mechanism it is possible to obtain a new, unknown class of amorphous, unsaturated copolymers which, by vulcanization, are able to give elastomers having good mechanical properties. More particularly, we have found that by using catalysts obtained from vanadium compounds, and metallo-organic compounds or hydrides of metals of Groups I, II and III of the Periodic Table or complex metallo-organic compounds or complex hydrides of metals of Groups I and III of the Periodic Table, it is possible to produce linear, amorphous, high molecular weight copolymers of one or more hydrocarbons containing at least one cycloheptatrienic ring with one or more monomers selected from ethylene and aliphatic alpha-olefins of the general formula R—CH=CH$_2$, wherein R is an alkyl group containing from 1 to 6 carbon atoms; said copolymers consisting of macromolecules containing unsaturations and consisting of monomer units derived from each of the monomers used.

Such a result was unpredictable, as it is known that the anionic, coordination catalysts used in the copolymerization of this invention are generally unable to promote the homopolymerization of cyclic, conjugated diolefins. It is therefore surprising that hydrocarbons containing at least one cycloheptatrienic ring are not only able to yield copolymers with ethylene and/or alpha-olefins, but also provide products which by vulcanization can be transformed into elastomers having good mechanical properties. These products can be profitably employed in every application field of natural and synthetic rubbers so far known.

As a non-restrictive example of hydrocarbons containing cycloheptatrienic rings which can be used according to the present invention, we mention the following:

(a) cycloheptatrienes, alkylcycloheptatrienes, preferably having from 1 to 8 carbon atoms in the alkyl groups, and arylcycloheptatrienes
(b) polycyclic hydrocarbons with isolated nuclei containing at least one cycloheptatrienic nucleus
(c) polycyclic hydrocarbons with condensed nuclei containing at least one cycloheptatrienic nucleus.

As non-restrictive examples of hydrocarbons belonging to class (a) we mention the following:

cycloheptatriene;
methylcycloheptatriene;
isopropylcycloheptatriene;
2,3,7,7 tetramethylcycloheptatriene 1-3-5;
3,7,7 trimethylcycloheptatriene 1-3-5;
3,4,7,7 tetramethylcycloheptatriene 1-3-5; and
phenylcycloheptatriene.

As non-restrictive examples of hydrocarbons belonging to class (b) we mention the following:

cycloheptatrienylcycloheptatriene,
cycloheptatrienylidencycloheptatriene,
cyclopentadienylcycloheptatriene,
cyclopentadienylidencycloheptatriene.

As a non-restrictive example of hydrocarbons belonging to class (c) the following can be mentioned: azulene and its alkyl derivatives.

The olefins which can be employed in the copolymer preparation together with hydrocarbons containing cycloheptatrienic nuclei comprise ethylene and alpha-olefins of the general formula R—CH=CH$_2$, wherein R is an alkyl group containing from 1 to 6 carbon atoms. In particular propylene and butene-1 can be mentioned. The best results are in general obtained when ethylene is present in the monomeric mixture to be copolymerized and therefore in the end-product.

By copolymerizing, e.g., a mixture of ethylene, propylene and/or butene-1 with cycloheptatriene 1-3-5 under the conditions of the process of this invention, which conditions are hereinbelow specified in more detail, a raw copolymerization product is obtained consisting of macromolecules in each of which, monomer units of ethylene, propylene and/or butene-1 and cycloheptatriene are present and distributed at random along the macromolecule chain.

Each of the monomeric units, in the macromolecule, derived from the polymerization of the hydrocarbon containing cycloheptatrienic nuclei, still contains free unsaturations. This is clearly apparent from examination by infrared spectrography. Such unsaturations are reacting points for successive reactions which may be effected on the copolymer. They, for example, allow the copolymer to be vulcanized by means of mixes containing sulfur of the type commonly used for low unsaturation rubbers. The double bonds which are present in the macromolecules may also, for example, after ozone oxidation, form polar groups, such as carbonyl groups which, in turn, may constitute reacting groups for successive reactions (i.e. vulcanization with polyvalent basic materials) carried out to improve the polymer adhesion.

The double bonds may also be employed in additional reactions with metal hydrides, e.g. LiH, NaBH$_4$, AlH(C$_4$H$_9$)$_2$ etc. The so-formed metal-carbon bonds may in turn serve in successive reactions.

The copolymers according to the present invention have a molecular weight, viscosimetrically measured, higher than 20,000, corresponding to an intrinsic viscosity, determined in tetrahydronaphthalene at 135° C. or in toluene at 30° C., higher than 0.5. The intrinsic viscosity of the copolymers may range from 0.5 to 10 but can reach even higher values. For most practical purposes, copolymers having intrinsic viscosities comprised between 1 and 5 are preferred.

Their composition can be defined as being practically homogeneous and the various monomeric units present therein are distributed at random. Evidence that these copolymers are homogeneous is provided by the fact that, in the case of an ethylene-propylene-cycloheptatriene terpolymer, it is possible to obtain well vulcanized products by means of the conventional techniques used in vulcanization of unsaturated rubbers, and more preferably of the low unsaturation type rubbers, such as, i.e., butyl rubber.

As evidence of the fact that the unsaturations are uniformly distributed along the chain, the vulcanizates thus obtained (unlike copolymers, as such, which are completely soluble in boiling n-heptane) are completely insoluble in organic solvents, such as aliphatic hydrocarbons, and only limitedly can they be swollen by some aromatic solvents. Furthermore, the vulcanizates thus obtained show very good mechanical resistance and low permanent deformations after break.

The catalytic systems for use in the process according to the present invention are very dispersed, or amorphous colloidally dispersed or completely dissolved in the hydrocarbons employed as copolymerization solvents, such as aliphatic, cycloaliphatic or aromatic hydrocarbons or mixtures thereof. They are obtained from metallo-organic compounds or hydrides of metals of Groups I, II and III of the Periodic Table or from complex metallo-organic compounds or complex hydrides of metals of Groups I and III of the Periodic Table and from vanadium compounds. More precisely, the following compounds can be used in the catalyst preparation according to the process of the present invention: Aluminum trialkyls, aluminum dialkylmonohalides, aluminum monoalkyldihalides, aluminum alkylsesquihalides, aluminum alkenyls, aluminum alkylenes, aluminum cycloalkyls, aluminum cycloalkylalkyls, aluminum aryls, aluminum alkylaryls, aluminum alkylhydrides, aluminum chlorohydrides or complexes of the above mentioned aluminum organic compounds with preferably weak Lewis' bases, lithium alkyls, lithium hydrides, lithium-aluminum tetraalkyls, lithium-aluminum alkylhydrides, lithium-aluminum hydrides, beryllium dialkyls, beryllium alkylhalides, beryllium diaryls, zinc dialkyls, zinc alkylhalides, zinc hydrides, calcium hydrides, cadmium dialkyls, cadmium diaryls, metallo-organic compounds wherein the metal may be attached with main valences not only to carbon and halogen atoms but also to oxygen atoms linked to an organic group, such as aluminum dialkyl alkoxides and aluminum alkylalkoxyhalides.

As a non-restrictive example of metallo-organic compounds which may be employed in the catalyst preparation we mention the following: aluminum triethyl, aluminum triisobutyl, aluminum trihexyl, aluminum diethylmonochloride, aluminum diethyl monoiodide, aluminum diethylmonofluoride, aluminum diisobutylmonochloride, aluminum monoethyldichloride, aluminum ethylsesquichloride, aluminum butenyldiethyl, aluminum isohexenyldiethyl, 2-methyl-1-4-di(aluminum diisobutyl) butane, aluminum tri(cyclopentylmethyl), aluminum tri(dimethylcyclopentylmethyl), aluminum triphenyl, aluminum tritolyl, aluminum di(cyclopentylmethyl)monochloride, aluminum diphenyl monochloride, aluminum diisobutylmonochloride in complex with anisole, aluminum diethylmonohydride, aluminum diisobutylmonohydride, aluminum monoethylhydride, lithium butyl, lithium aluminum tetrabutyl, lithium aluminum tetrahexyl, lithium aluminum tetraoctyl, lithium aluminum diisobutyl dihydride, beryllium dimethyl, beryllium methylchloride, beryllium diethyl, beryllium di-n-propyl, beryllium diisopropyl, beryllium di-n-butyl, beryllium di-t-butyl, beryllium diphenyl, zinc dimethyl, cadmium di-iso-butyl, cadmium diphenyl, aluminum monochloromonoethyl monoethoxide, aluminum diethylpropoxide, aluminum diethylamiloxides, aluminum monochloro monopropylmonopropoxide, and aluminum monochloromonopropylmethoxide.

In practice, we have found that the best results are obtained when aluminum, beryllium or lithium-aluminum metallo-organic compounds or hydrides are used in the catalyst preparation.

Vanadium compounds soluble in the hydrocarbons used as copolymerization media are preferably employed in the catalyst preparation. Therefore, halides and oxyhalides (such as, e.g. $VCl_4$, $COCl_3$, $VBr_4$) and those compounds in which at least one of the metal valences is saturated by a heteroatom (in particular oxygen and nitrogen) linked to an organic group such as vanadium triacetylacetonate, vanadium tribenzoylacetonate, vanadyl diacetylacetonate, vanadyl halogenacetylacetonates, vanadyl trialcoholates and vanadyl haloalcoholates, vanadium tri- and tetrachloride and vanadyl trichloride tetrahydrofuranates, etherates and aminates, vanadium tri- and tetrachloride and vanadyl trichloride pyridinates and quinolinates are used in the catalyst preparation.

Vanadium compounds insoluble in hydrocarbons chosen among organic salts, such as e.g. vanadium triacetate, tribenzoate and tristearate may also be employed.

In order to obtain the best results it is necessary to carry out the polymerization in the presence of a halogen-containing catalyst system obtained by mixing a vandium compound with metallo-organic compound or a hydride of metals of Groups I, II and III of the Periodic Table or a complex metallo-organic compound or a complex hydride of metals of Groups I and III of the Periodic Table at least one of the valences of the vanadium and/or at least one of the valences of said other metals of the metallo-organic or hydride compounds being saturated by a halogen atom. Thus while with halogen-containing vanadium compounds all the above mentioned metallo-organic or hydride compounds may be used, with halogen-free vanadium compounds it is necessary to use halogen-containing metallo-organic or hydride compounds.

The copolymerization process described in the present invention may be conducted at temperatures ranging from —80° to 125° C.

In case catalysts prepared from vanadium triacetylacetonate, vanadyl diacetylacetonate and halogen acetylacetonates, and in general from a vanadium compound in the presence of metallo-organic or hydride compounds containing halogen, are employed to produce a high copolymer field per unit by weight of the catalyst used, it is convenient to perform both the catalyst preparation and the copolymerization at temperatures ranging from 0° C. to —80° C., and more preferably from —10° C. to —50° C. By operating under these conditions, the catalysts show a much higher activity than that of catalytic systems prepared at higher temperatures. Furthermore, by operating in the above mentioned low temperature range, the catalyst activity remains practically unaltered with respect to time.

If catalysts obtained from aluminum alkylhalides and from vanadium triacetylacetonate, vanadyl trialcoholates or vanadyl haloalcoholates are employed at temperatures between 0° C. and 125° C., it is convenient to operate in the presence of particular complexing agents, selected from the group consisting of ethers, thioethers, tertiary amines, and trisubstituted phosphines, containing at least one branched alkyl group or an aromatic nucleus, in order to obtain a high copolymer yield. The complexing agent may be an ether of the formula RYR′, wherein Y is oxygen or sulfur and R and R′ each represent a linear or branched alkyl group containing 1 to 14 carbon atoms or an aromatic nucleus containing from 6 to 14 carbon atoms, at least one of the R and R′ being a branched alkyl group or an aromatic nucleus.

The complexing agent may be a tertiary amine of the formula

wherein R, R' and R" each represent an alkyl group containing from 1 to 14 carbon atoms or an aromatic nucleus containing from 6 to 14 carbon atoms, at least one of the R, R' and R" being an aromatic nucleus.

The complexing agent may also be a tertiary phosphine of the formula

wherein R, R' and R" each represent an alkyl group containing from 1 to 14 carbon atoms or an aromatic nucleus containing from 6 to 14 carbon atoms at least one of the R, R' and R" being an aromatic nucleus.

The amount of complexing agent should preferably range from 0.05 to 1 mole per mole of aluminum alkylhalide.

The activity of the catalyst used in the process, here described, varies according to the molar ratio between the compounds employed in the catalyst preparation.

According to the present invention, we have found that when using, for example, aluminum trialkyls and vanadium halides or oxyhalides, it is convenient to employ catalysts in which the molar ratio of aluminum trialkyl to vanadium compound ranges from 1 to 5, and more preferably from 2 to 4. Whereas, when using aluminum diethylmonochloride ($Al(C_2H_5)_2Cl$) and vanadium triacetylacetonate ($VAc_3$), the best results are obtained with a molar ratio of $Al(C_2H_5)_2Cl$ to $VAc_3$ ranging from 2 to 20, and more preferably from 4 to 10.

The copolymerization of the present invention may be carried out in the presence of an aliphatic, cycloaliphatic or aromatic hydrocarbon solvent such as butane, pentane, n-heptane, cyclohexane, toluene, xylene and mixtures thereof. Hydrocarbon halides inert to the catalyst, such as chloroform, methylene chloride, trichloroethylene, tetrachloroethylene, chlorobenzenes and the like may also be used as solvents. Considerably high copolymerization rates can be reached when the copolymerization is carried out in the absence of an inert solvent, using the monomers themselves in the liquid state, that is, i.e., in presence of an ethylene solution in the mixture of alpha-olefins and hydrocarbons containing cycloheptatrienic nuclei to be copolymerized, kept in the liquid state.

In order to obtain highly homogeneous copolymers it is convenient to maintain, the ratio between the concentrations of the monomers to be copolymerized which are present in the liquid reacting phase constant or at least as constant as possible during the copolymerization. For this purpose the copolymerization may be advantageously conducted by continuously feeding and discharging a monomer mixture of constant composition and by operating at high spatial rates.

By varying the composition of the monomeric mixture, the composition of the copolymers may be varied over wide ranges. In case amorphous copolymers of hydrocarbons containing cycloheptatrienic nuclei with ethylene and propylene are desired, it is advisable to maintain a molar ratio of ethylene to propoylene, in the reacting liquid phase, below or at most equal to 1:4. This corresponds to a molar ratio of ethylene to propylene in the gas phase lower than or at most equal to 1:1 under normal conditions. Molar ratios comprised between 1:200 and 1:4 in the liquid phase are generally satisfactory.

In case butene-1 is employed instead of propylene, the molar ratio between ethylene and butene-1 must be below or at most equal to 1:20. The corresponding molar ratio ethylene to butene-1 in the gas phase is 1:1.5. Molar ratios in the liquid phase comprised between 1:1000 and 1:20 are generally satisfactory.

By operating under these conditions amorphous terpolymers are obtained which contain less than 75% by mols of ethylene. At higher ethylene contents the terpolymer shows a polyethylenic type of crystallinity. The ethylene lower limit is not critical, although it is generally preferred that the terpolymers contain at least 5% by mols of ethylene. The alpha-olefin content in the amorphous terpolymer may range from a minimum of 5% by mols up to a maximum value of 95% by mols. It is in general convenient, more particularly for economical reasons, to introduce a total cycloheptatriene amount lower than 20% by mols into the terpolymer. Cycloheptatriene amounts comprised between 0.1 and 20% are usually preferred. In case amorphous binary copolymers of ethylene and cycloheptatriene are to be obtained, it is necessary to introduce a cycloheptatriene amount of at least 25% by mols into the copolymer.

The copolymers of this invention, as such, show the same properties as non-vulcanized elastomers, in that they show low initial elastic moduli and very high ultimate elongations.

The presence of unsaturations in the macromolecules making up these copolymers making them capable of being vulcanized by means of the conventional methods used for unsaturated rubbers, and in particular for the low unsaturation types of rubbers. The vulcanizates show high reversible elastic elongations and in particular when reinforcing fillers, such as carbon black, are employed in the mix, they also show high ultimate tensile strengths. The elastomers obtained by vulcanization of the copolymers object of the present invention can be profitably used, owing to their good mechanical properties, for manufacturing various articles, such as shaped articles, pipes, etc.

The following examples are simply illustrative and not limitative of the present invention.

EXAMPLE 1

The reaction apparatus is made up of a glass cylindrical reactor having a 5.5 cm. diameter and a 700 cc. capacity, provided with a stirrer and gas inlet and outlet tubes. The gas inlet tube reaches the bottom of the reactor and ends with a porous plate (diameter 3.5 cm.).

In the reactor thermostatically kept at $-20°$ C., are introduced 200 cc. anhydrous n-heptane and 25 cc. 1-3-5-cycloheptatriene. From the gas inlet tube a 2:1 mixture of propylene and ethylene is sent in and circulated at a rate 200 Nl./h.

The catalyst is prepared, in a 100 cc. flask, by operating at $-20°$ C. in a nitrogen atmosphere and by reacting 1 millimole of vanadium tetrachloride and 5 millimoles of aluminum diethylmonochloride in 30 cc. of anhydrous n-heptane. The catalyst thus obtained is siphoned into the reactor by means of nitrogen pressure.

The propoylene-ethylene mixture is continuously fed and discharged at a rate of 400 Nl./h. After 6 minutes, the reaction is stopped by the addition of 20 cc. methanol containing 0.1 g. phenyl-beta-naphthylamine.

The product is purified in a separatory funnel, in a nitrogen atmosphere, through several treatments with diluted hydrochloric acid and then with water and is coagulated in excess acetone.

After vacuum drying, 10 g. of solid product, amorphous by X-ray examination, which looks like a non-vulcanized elastomer and is completely soluble in boiling n-heptane are obtained. Examination by infrared spectrography shows the presence of double bonds ($6.00\mu$ zone). The molar ratio of ethylene to propylene is about 1:1.

100 parts by weight of the ethylene-propylene-cycloheptatriene terpolymer are mixed in a laboratory roll mixer with:

| | Parts |
|---|---|
| Phenyl-beta-naphthylamine | 1 |
| Sulfur | 4 |
| Zinc oxide | 5 |
| Tetramethyl-thiuram disulphide | 1 |
| Mercaptobenzothiazole | 0.5 |

The mix is vulcanized in a press for 60 minutes at 150° C.

A vulcanized sheet having the following characteristics is obtained:

| | |
|---|---|
| Ultimate tensile strength (kg./cm.$^2$) | 23.4 |
| Elongation at break (percent) | 320 |
| Modulus at 300% (kg./cm.$^2$) | 21.6 |
| Permanent set after break (percent) | 4 |

The low values of the permanent set and of the modulus show that the product has very good elastomeric properties.

EXAMPLE 2

Into the same reaction apparatus, described in Example 1, thermostatically kept at −20° C., are introduced 200 cc. of anhydrous n-heptane and 20 cc. of 1-3-5-cycloheptatriene.

A 2:1 mixture of propylene and ethylene is sent in by the gas inlet tube and circulated at a rate of 200 Nl./h. The catalyst is prepared in a 100 cc. flask, by operating at −20° C. in a nitrogen atmosphere and by reacting 1 millimole of vanadium tetrachloride and 2.5 millimoles of aluminum trihexyl in 30 cc. of n-heptane. The thus obtained catalyst is siphoned into the reactor by means of nitrogen pressure.

The propylene-ethylene mixture is continuously fed and discharged at a rate of 400 Nl./h. After 1 minute and a half, the reaction is stopped by the addition of 10 cc. of methanol containing 0.1 g. phenyl-beta-naphthylamine.

The product is purified and separated as described in Example 1. After vacuum drying 2.8 g. of solid product, amorphous by X-ray examination, which looks like a non-vulcanized elastomer and is completely soluble in boiling n-heptane, are obtained. Examination by infrared spectrography shows the presence of double bonds (6.00μ zone). The molar ratio of ethylene to propylene is about 1:1.

100 parts by weight of the ethylene-propylene-cycloheptatriene terpolymer are mixed in a laboratory roll mixer with:

| | Parts |
|---|---|
| Phenyl-beta-naphthylamine | 1 |
| Sulfur | 2 |
| Zinc oxide | 5 |
| Tetramethyl-thiuram disulphide | 1 |
| Mercaptobenzothiazole | 0.5 |

The mixture is vulcanized in a press for 60 minutes at 150° C. A vulcanized sheet having the following characteristics is obtained:

| | |
|---|---|
| Ultimate tensile strength (kg./cm.$^2$) | 55 |
| Elongation at break (percent) | 320 |
| Modulus at 300% (kg./cm.$^2$) | 15.1 |
| Permanent deformation after break (percent) | 15 |

EXAMPLE 3

Into the same reactor apparatus as described in Example 1, thermostatically kept at −20° C., are introduced 200 cc. of anhydrous n-heptane and 20 cc. of 1-3-5-cycloheptatriene. A mixture of propylene and ethylene in the molar ratio of 2:1 is sent in by the gas inlet tube and circulated at a rate of 200 Nl./h. The catalyst is prepared in a 100 cc. flask by operating at −20° C. in a nitrogen atmosphere and by reacting 1 millimole of vanadium tetrachloride and 5 millimoles of aluminum diethylmonochloride in 30 cc. of anhydrous n-heptane. The so prepared catalyst is siphoned into the reactor by means of nitrogen pressure.

The gaseous ethylene-propylene mixture is continuously fed and discharged at a rate of 400 Nl./h. After 5 minutes, the reaction is stopped by the addition of 10 cc. of methanol containing 0.1 g. phenyl-beta-naphthylamine.

The product is purified and separated as described in Example 1. After vacuum drying, 13 g. of solid product, amorphous by X-ray examination, completely soluble in boiling n-heptane, which looks like a non-vulcanized elastomer, are obtained. Examination by infrared spectrography shows the presence of double bonds (6.00μ zone).

The ethylene-propylene-cycloheptatriene terpolymer is vulcanized by means of the same mix and same procedure as in Example 2. A vulcanized sheet having the following characteristics is obtained:

| | |
|---|---|
| Ultimate tensile strength (kg./cm.$^2$) | 27 |
| Elongation at break (percent) | 400 |
| Modulus at 300% (kg./cm.$^2$) | 15 |
| Permanent deformation after break (percent) | 8 |

When, in addition to the ingredients employed in Example 2, 50 parts by weight HAF carbon black are used, the vulcanization being carried out as in Example 2, a vulcanized sheet having the following characteristics is obtained:

| | |
|---|---|
| Ultimate tensile strength (kg./cm.$^2$) | 178 |
| Elongation at break (percent) | 320 |
| Modulus at 300% (kg./cm.$^2$) | 165 |
| Permanent deformation after break (percent) | 10 |

EXAMPLE 4

In the same reaction apparatus as described in Example 1, thermostatically kept at −20° C., are introduced 200 cc. in n-heptane and 20 cc. of 1-3-5-cycloheptatriene. A gaseous 4:1 mixture of propylene and ethylene is sent in by the gas inlet tube and circulated at a rate of 200 Nl./h.

The catalyst is prepared in a 100 cc. flask, by operating at −20° C. in a nitrogen atmosphere and by reacting 1.4 millimoles of vanadium triacetylacetonate and 7 millimoles of aluminum diethylmonochloride, in 30 cc. of anhydrous toluene. The thus obtained catalyst is kept at −20° C. for 5 minutes and then siphoned into the reactor by means of nitrogen pressure.

The gaseous propylene-ethylene mixture is continuously fed and discharged at a rate of 400 Nl./h. After 20 minutes, the same amount of catalyst as previously used is introduced into the reactor. After 45 minutes, the reaction is stopped by the addition of 10 cc. of methanol containing 0.1 g. phenyl-beta-nephthylamine. The product is purified and isolated as described in Example 1.

After vacuum drying, 12 g. of solid product, amorphous by X-ray examination, completely soluble in boiling n-heptane, and which looks like a non-vulcanized elastomer, are obtained.

The ethylene-propylene-cycloheptatriene terpolymer is vulcanized by means of the same mix and procedure as is Example 1. A vulcanized sheet having the following characteristics is obtained:

| | |
|---|---|
| Ultimate tensile strength (kg./cm.$^2$) | 19.5 |
| Elongation at break (percent) | 360 |
| Modulus at 300% (kg./cm.$^2$) | 15.6 |
| Permanent deformation after break (percent) | 4 |

When, in addition to the above mentioned ingredients, 50 parts by weight of carbon black HAF are used, the vulcanization being carried out as in Example 2, a vulcanized sheet having the following characteristics is obtained:

Ultimate tensile strength (kg./cm.²) _____ 171
Elongation at break (percent) _____ 340
Modulus at 300% (kg./cm.²) _____ 152
Permanent deformation after break (percent) _____ 10

EXAMPLE 5

Into the same reaction apparatus as described in Example 1, thermostatically kept at 25° C., are introduced 200 cc. of n-heptane and 20 cc. of 1-3-5-cycloheptatriene. A gaseous mixture of propylene and ethylene in the molar ratio 2:1 is sent in by the gas inlet tube and circulated at a rate of 200 Nl./h.

The catalyst is prepared in a 100 cc. flask by operating at 25° C. in a nitrogen atmosphere and by reacting 1 millimole of vanadium tetrachloride and 5 millimoles of aluminum diethylmonochloride in 30 cc. of anhydrous n-heptane. The thus obtained catalyst is sent into the reactor by means of nitrogen pressure.

The gaseous propylene-ethylene mixture is continuously fed and discharged at a rate of 400 Nl./h. After 30 minutes, the reaction is interrupted by the addition of 10 cc. of methanol containing 0.1 g. phenyl-beta-naphthylamine. The product is purified and isolated as described in Example 1.

After vacuum drying 2.5 g. of solid product, amorphous by X-ray examination, completely soluble in boiling n-heptane, and which looks like a non-vulcanized elastomer, are obtained. Examination by infrared spectrography shows the presence of unsaturations (6.00µ zone).

The ethylene-propylene-cycloheptatriene terpolymer is vulcanized with the same mix and procedure as described in Example 1. A vulcanized sheet having the following characteristics is obtained:

Ultimate tensile strength (kg./cm.²) _____ 54
Elongation at break (percent) _____ 520
Modulus at 300% (kg./cm.²) _____ 17

EXAMPLE 6

Into the same reaction apparatus as described in Example 1, kept at −20° C., are introduced 200 cc. of anhydrous n-heptane and 20 cc. of 1-3-5-cycloheptatriene. A gaseous propylene-ethylene mixture in the molar ratio 2:1 is introduced through the gas inlet tube and circulated at a rate of 200 Nl./h.

The catalyst is prepared in a 100 cc. flask by operating at −20° C. under nitrogen atmosphere and by reacting 1 millimole of vanadium tetrachloride and 3.75 millimoles of beryllium diethyl in 30 cc. of anhydrous n-heptane. The thus pre-formed catalyst is siphoned into the reactor by means of nitrogen pressure.

The gaseous propylene-ethylene mixture is continuously fed and discharged at a rate of 400 Nl./h. Two minutes after the beginning, the reaction is stopped by adding 10 cc. of methanol containing 0.1 g. of phenyl-beta-naphthylamine.

The product is purified and isolated as described in Example 1. After vacuum drying 3.2 g. of solid product, which is amorphous by X-ray examination, is completely soluble in boiling n-heptane and looks like a non-vulcanized elastomer, are obtained. Examination by infrared spectrography shows the presence of double bonds (zone at 6.00 microns). The ethylene-propylene molar ratio is about 1:1.

100 parts by weight of the ethylene-propylene-cycloheptatriene terpolymer are mixed in a laboratory roll mixer with 1 part of phenyl-beta-naphthylamine, 2 parts of sulfur, 5 parts of zinc oxide, 1 part of tetramethylthiuramdisulphide, 0.5 parts of mercaptobenzothiazole. The mixture is vulcanized in a press for 60 minuptes at 150° C. A vulcanized sheet having the following characteristics is obtained:

Tensile strength (kg./cm.²) _____ 56
Elongation at break (percent) _____ 330
Modulus at 300% (kg./cm.²) _____ 15.1

EXAMPLE 7

Into the same apparatus as described in Example 1 kept at −10° C. are introduced 200 cc. of anhydrous n-heptane and 20 cc. of 1-3-5-cycloheptatriene. A mixture of butene-1 and ethylene in the molar ratio of 3:1 is introduced through the gas inlet tube and circulated at a rate of 200 Nl./h.

The catalyst is prepared in a 100 cc. flask by operating at −20° C. in a nitrogen atmosphere and by reacting 1 millimole of vanadium tetrachloride and 5 millimols of aluminumdiethylmonochloride. The thus preformed catalyst is siphoned into the reactor by means of nitrogen pressure.

The ethylene-butene mixture is continuously fed and introduced at a rate of 400 Nl./h. 6 minutes after the beginning, the reaction is stopped by adding 10 cc. of methanol containing 0.1 g. of phenyl-beta-naphthylamine.

The product is isolated and purified as described in Example 1. After vacuum drying 12 g. of solid product, which is amorphous by X-ray examination, is completely soluble in boiling n-heptane, and looks like a non-vulcanized elastomer, are obtained. The infrared spectrographic examination shows the presence of double bonds (zone at 6.00 microns).

The ethylene-propylene-cycloheptatriene terpolymer is vulcanized with the same mix and procedure described in Example 1.

A vulcanized lamina having the following characteristics is obtained:

Tensile strength (kg./cm.²) _____ 26
Elongation at break (percent) _____ 420
Modulus at 300% (kg./cm.²) _____ 14

EXAMPLE 8

Into the same reaction apparatus as described in Example 1 kept at −10° C., are introduced 200 cc. of anhydrous n-heptane and 20 cc. of 1-3-5-cycloheptatriene. A gaseous ethylene-propylene-butene-1 mixture in the molar ratio 1:2:2 is introduced through the gas inlet tube and circulated at the rate of 200 Nl./h.

The catalyst is pre-formed in a 100 cc. flask by operating at −10° C. under a nitrogen atmosphere and by reacting 1 millimole of vanadium tetrachloride and 5 millimols of aluminum diisobutylmonochloride in 30 cc. of anhydrous n-heptane. The thus pre-formed catalyst is siphoned into the reactor by means of nitrogen pressure.

The ethylene-propylene-butene-1 mixture is continuously fed at a rate of 400 Nl./h. 5 minutes after the beginning, the reaction is stopped by adding 20 cc. of methanol containing 0.1 g. of phenyl-beta-naphthylamine.

The product is purified and isolated as described in Example 1. After vacuum drying 11 g. of solid product, which is amorphous by X-ray examination, looks like a non-vulcanized elastomer and is completely soluble in boiling n-heptane, are obtained. Infrared spectrographic examination shows the presence of double bonds (zone at 6 microns), of methylenic sequences of various length (zone between 13 and 13.8 microns), of methyl groups (band at 7.25 microns) and of ethyl groups (band at 12.95–13 microns) in an amount corresponding to about the 50% of that of the methyl groups. Similar results are obtained by using aluminum chlorohydride in the preparation of the catalyst.

The copolymer is vulcanized with the mix and the modalities of Example 2.

A vulcanized lamina having the following characteristics is obtained:

Tensile strength (kg./cm.²) _____ 29
Elongation at break (percent) _____ 460
Modulus at 300% (kg./cm.²) _____ 13

Similar results are obtained by employing a catalyst prepared from vanadium trichloride pyridinate and aluminum diethylmonochloride and by carrying out the polymerization in toluene.

What is claimed is:
1. Substantially linear, amorphous, vulcanizable, high molecular weight terpolymers of ethylene and aliphatic alpha-olefin of the general formula R—CH=CH$_2$, wherein R is an alkyl group containing from 1 to 6 carbon atoms, and a cycloheptatriene, said terpolymers consisting substantially of unsaturated macromolecules each of which is made up of polymerized units of each of the starting monomers.

2. Copolymers according to claim 1, consisting substantially of macromolecules each made up of polymerized units of ethylene, propylene and 1-3-5-cycloheptatriene.

3. Copolymers according to claim 1, consisting substantially of macromolecules each made up of polymerized units of ethylene, butene-1 and 1-3-5-cycloheptatriene.

4. A process for the preparation of copolymers according to claim 1, characterized in that the monomeric mixture is polymerized in the presence of a catalyst obtained by mixing
  (a) a vanadium compound selected from the group consisting of the halides, oxyhalides and those compounds in which at least one of the metal valences is saturated by either oxygen or nitrogen which is linked to an organic group and
  (b) a compound selected from the group consisting of organometallic compounds of metals of Groups I, II and III of the Periodic Table, hydrides of metals of Groups I, II and III of the Periodic Table, complex organometallic compounds of metals of Groups I and III of the Periodic Table and complex hydrides of metals of Groups I and III of the Periodic Table, at least one of (a) and (b) containing halogen.

5. The process according to claim 4, characterized in that the catalyst is obtained from a vanadium compound hydrocarbon-soluble.

6. The process according to claim 5 characterized in that the polymerization is conducted at temperatures ranging from —80° C. to +125° C.

7. The process according to claim 5 characterized in that the catalysts obtained from a vanadium compound and an aluminum alkylhalide are used, and both the catalyst prepration and the polymerization are carried out at temperatures ranging from 0° C. to —80° C.

8. The process according to claim 5 characterized in that catalysts obtained from a vanadium compound and an aluminum alkylhalide are used and both the catalyst preparation and the polymerization are carried out at temperatures ranging from —10° C. to —50° C.

9. The process according to claim 5, characterized in that a catalyst obtained from aluminum diethylmonochloride and vanadium triacetylacetonate is employed and the molar ratio between the aluminum diethylmonochloride and vanadium triacetylacetonate ranges from 2 to 20.

10. The process according to claim 5, characterized in that the polymerization occurs with the monomers present in the liquid state and in the absence of any extraneous inert solvent.

References Cited
UNITED STATES PATENTS

| | | | |
|---|---|---|---|
| 2,809,372 | 10/1957 | Frederick et al. | 260—85.3 |
| 2,962,488 | 11/1960 | Horne | 260—94.7 |
| 3,211,709 | 10/1965 | Adamek et al. | 260—80.78 |
| 3,260,708 | 7/1966 | Natta et al. | 260—80.5 |

OTHER REFERENCES

Chemical Abstract 57, 10026 G (1962).

JAMES A. SEIDLECK, Primary Examiner

U.S. Cl. X.R.

260—41, 79.5, 80.7, 88.2